June 25, 1974 H. C. NORTH ET AL 3,819,790
MULTI-STEP AIR RING FOR TUBULAR FILM PROCESS
Original Filed Dec. 22, 1969 5 Sheets-Sheet 1

INVENTORS
HOWARD C. NORTH
GENE C. CALDERWOOD
CHARLES W. WILLIAMSON
BY
Charles A. Cohen AGENT

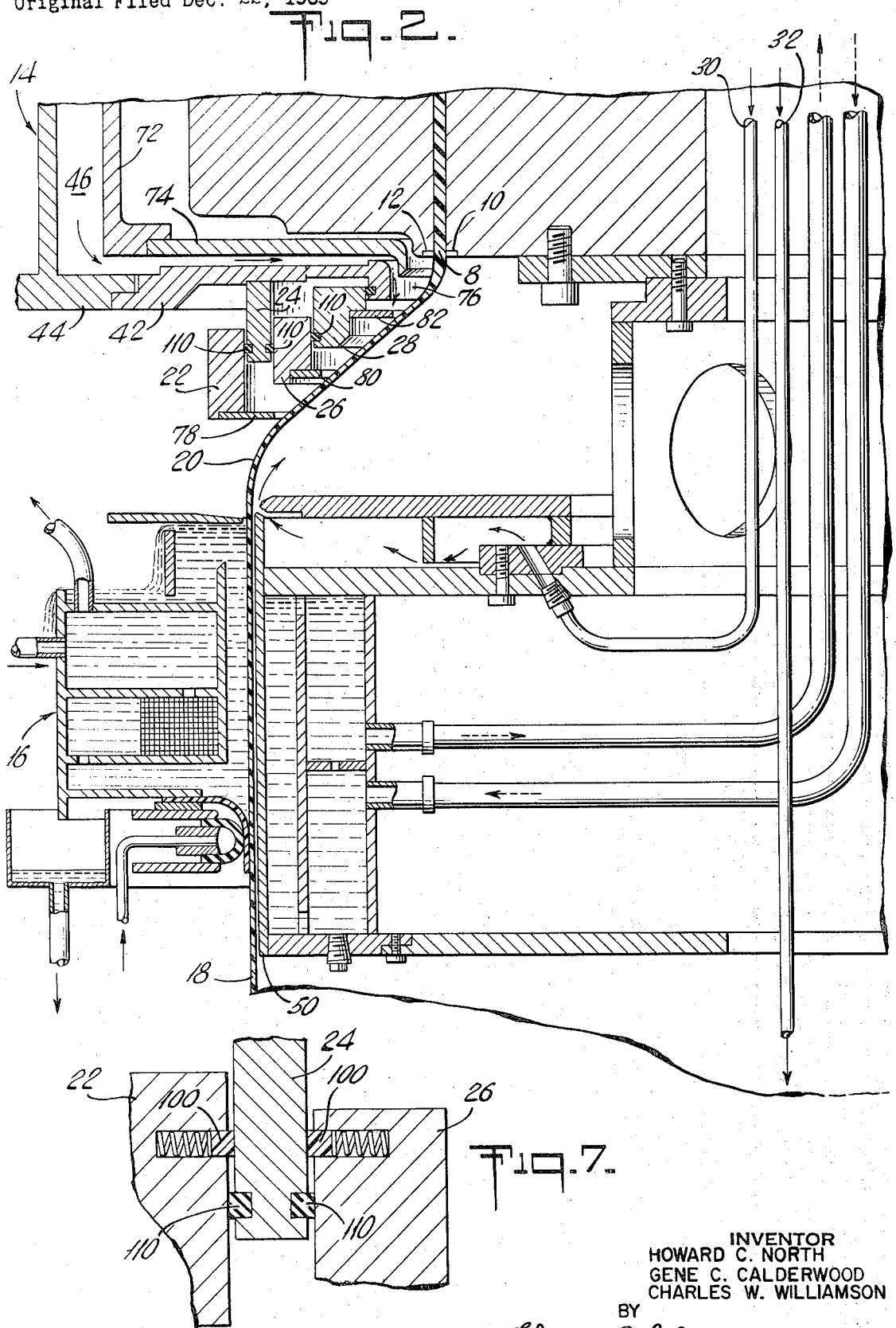

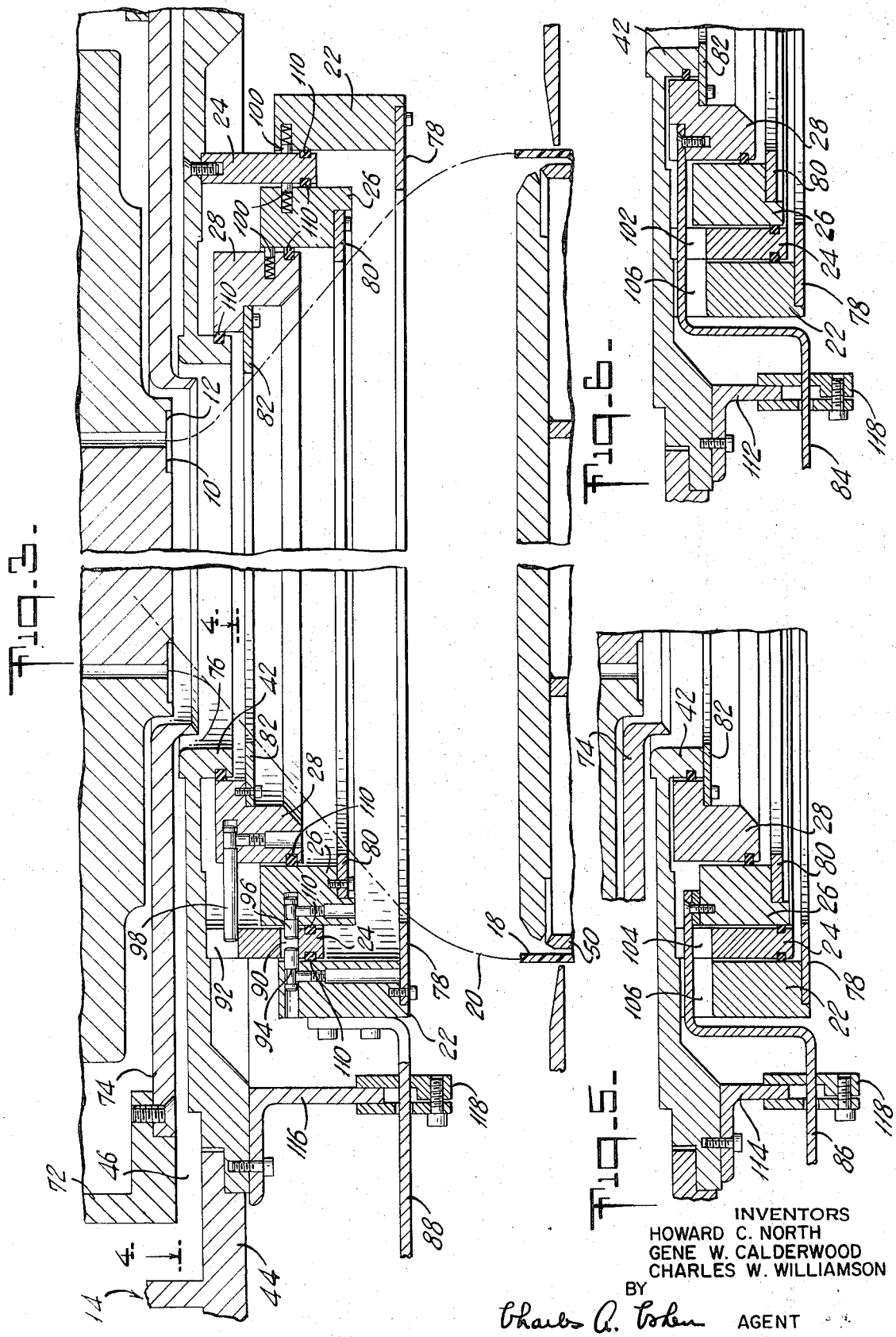

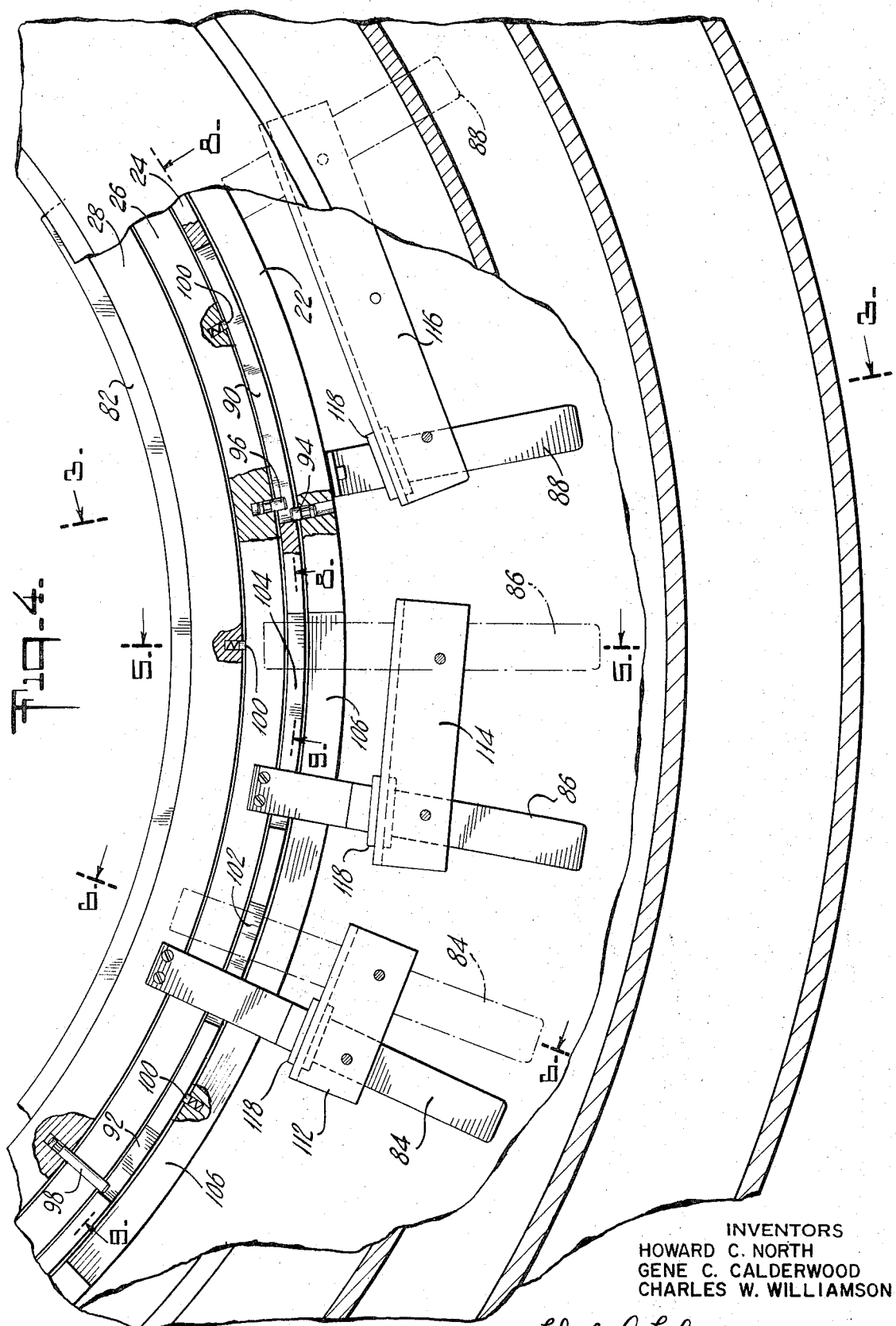

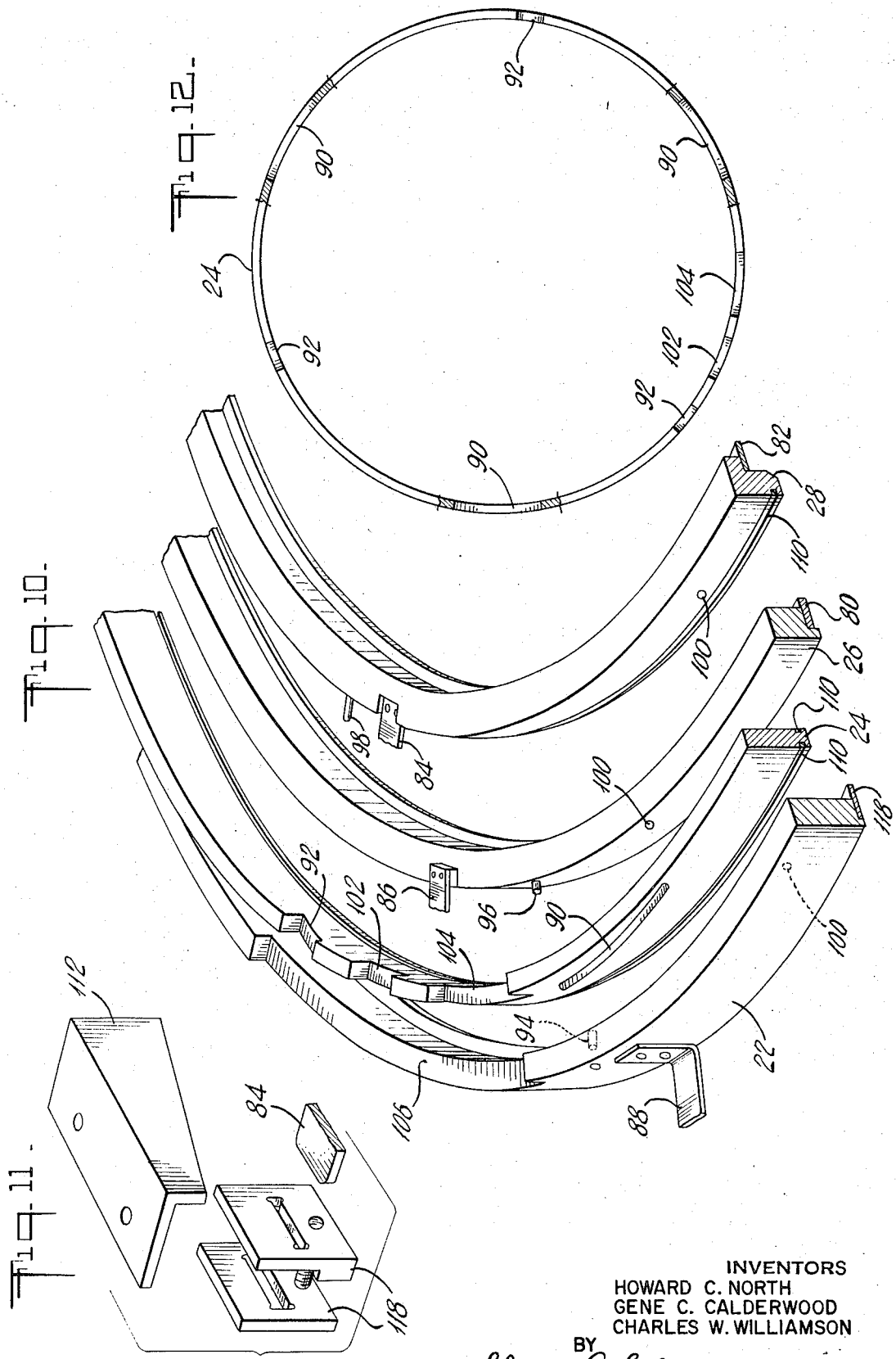

United States Patent Office 3,819,790
Patented June 25, 1974

3,819,790
MULTI-STEP AIR RING FOR TUBULAR FILM PROCESS
Howard C. North, Westfield, and Gene C. Calderwood, Basking Ridge, N.J., and Charles W. Williamson, Seabrook, Tex., assignors to Esso Research and Engineering Company
Continuation of abandoned application Ser. No. 887,270, Dec. 22, 1969. This application May 8, 1972, Ser. No. 251,504
Int. Cl. B29d 23/04
U.S. Cl. 264—89
7 Claims

ABSTRACT OF THE DISCLOSURE

In the extrusion of a thermoplastic resin through a ring die to form a tubular film wherein the film is partially cooled by means of a cooling gas before the tube is drawn over a cooling mandrel, the improvement of using multi-stepped adjustable rings to direct the cooling gas onto the external surface of the film between the die-gap and the mandrel, thus defining a series of orifices between the rings and the film to effect a gradient in pressure from the die to the mandrel.

---

This is a continuation of application Ser. No. 887,270, filed Dec. 22, 1969, now abandoned.

CROSS REFERENCES TO RELATED PATENTS AND APPLICATIONS

This invention relates to the process and apparatus for preparing film from thermoplastic resins described in U.S. Pats. 3,400,184 and 3,450,806, the disclosures of which are hereby incorporated in this application by reference. A further improvement in the method and apparatus for water-cooling the film is disclosed in copending application U.S. Ser. No. 853,381, filed Aug. 27, 1969, now U.S. Pat. No. 3,685,576, issued Aug. 22, 1972.

FIELD OF THE INVENTION

This invention relates to an apparatus and process for preparing film from thermoplastic resins. More particularly, this invention is concerned with the structure and use of a plurality of rings for directing a stream of cooling gas against the surface of a tubular film of a thermoplastic resin, issuing in the molten state from an annular die, before the film engages and is drawn over a sizing and cooling mandrel. Use of the multi-stepped rings disposed in an echelon array, with the inner edges of the rings being substantially in lineal alignment, creates a series of pressure drops of diminishing scope at each successive lower ring and permits the production of film having higher die-gap diameter to mandrel-diameter ratios and differentials, faster draw-down to permit higher die-gap to finished film thickness ratios and superior clarity.

PRIOR ART

The use of a simple air-ring for externally cooling a tubular film of molten thermoplastic resin issuing from an annular orifice or die while at the same time maintaining the film in an inflated state by use of an internal pressure of air, before folding, slitting or drawing the film over a cooling mandrel is old in the art. For example, British Pat. 943,283 (4–XII–63) shows an internally baffled air-ring having a single annular outlet for directing a stream of cooled air against the outer surface of an inflated tubular film issuing in an upward manner from a rotating die. Closely allied to the present invention is the simple air-ring designated as 29 in FIGS. 11 and 14 in U.S. Pat. 3,400,184.

SUMMARY

We have now found that tubular film of improved clarity may be produced at higher speeds if the multi-stepped air-ring of the present invention is used with the type of equipment shown in U.S. Pats. 3,400,184 and 3,450,806 instead of the simple air-ring described in these patents. The present invention consists of a plurality of nested rings sealed against inter-ring leakage, which are adjustable vertically by means of cams and cam followers to form a conical array or echelon. Attached to each ring is an orifice plate which defines a circular opening for each ring. The entire assembly which is disposed between the die and mandrel is constructed so that the smallest orifice is equal to or larger in diameter than the die and the largest orifice is equal to or smaller in diameter than the diameter of the mandrel.

In use, the rings are adjusted vertically so that the inner edges of the orifices fall substantially on a straight line projected through them and lie outside a straight line projected from the die-gap to the top edge of the mandrel. While the inner edges of the orifices will fall on a straight line under normal conditions, variations in feed, temperature, draw-down speed and the like may make it desirable to depart from a straight-line array and have the edges of the orifice plates fall on an arc projected through them. Such an arc may be convex or concave to the center line of the die but in no case will the sagitta exceed 7.5% of the length of the chord subtending the arc. Under these conditions, the cooling air which issues from the ring above the top orifice plate and is directed downwardly against the film issuing from the die to successively lower orifice plates, creates a series of pressure drops across each orifice with each successively lower orifice exhibiting a lower differential pressure. When the rings are adjusted in the above manner, the thermoplastic bubble issuing from the die is free of "flutter" which causes wrinkling in the film, higher mandrel to die-gap differential ratios may be employed and faster feeds and draw-down of film over the mandrel may be achieved with the production of film having uniform gauge and high clarity.

BRIEF DESCRIPTION OF DRAWINGS

FIG. 2 shows an enlarged section through a portion of FIG. 1 in greater detail.

FIG. 3 is a detailed section through the die and air-rings corresponding to a section on line 3—3 of FIG. 4.

FIG. 4 is a partial plan view of the air-rings showing the ring controls.

FIG. 5 is a sectional view along line 5—5 of FIG. 4 showing the rings in raised position and the control handle for the middle ring.

FIG. 6 is a sectional view on line 6—6 of FIG. 4 showing the control handle for the inner ring.

FIG. 7 is an enlarged section through a portion of the outer ring, cam ring and middle ring showing the "O" rings and spring biased spacing buttons.

FIG. 10 is an exploded view of a segment of the outer ring, cam ring, middle ring and inner ring showing the means of attachment of ring-control handles, clearance slots for the handles, the cam tracks and cam followers.

FIG. 11 shows a detail of a typical angle track and handle clamp.

FIG. 12 is a plan view of the cam ring showing the angular displacement of the cam slots and handle clearance slots.

DETAILED DESCRIPTION OF DRAWINGS

Figure 1:
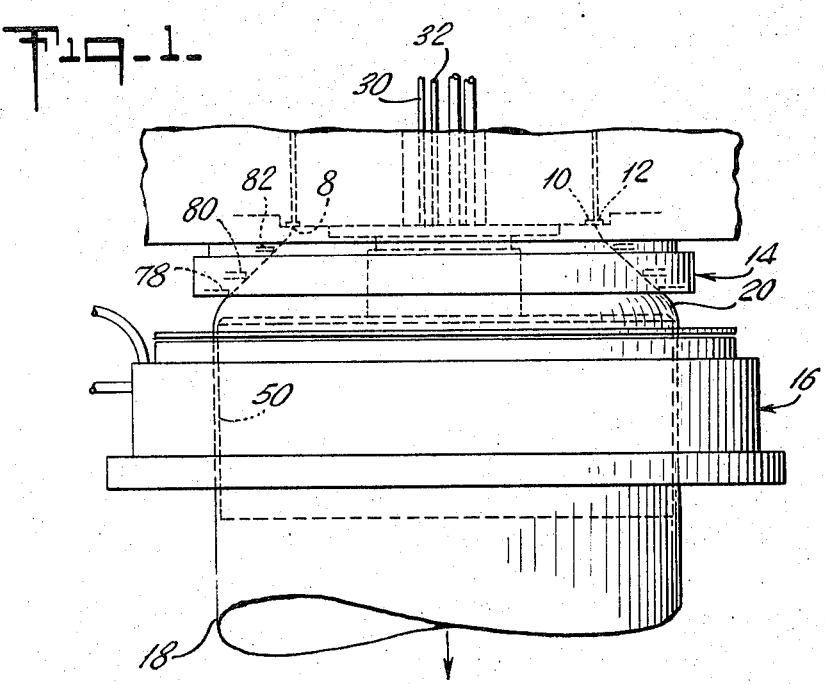
FIG. 1 shows a general view of the disposition of a die, the multi-step air-rings comprising this invention, cooling mandrel, water bath and extrudate from the die being directed by the air-rings and drawn over the cooling mandrel and through the water bath in a downward direction.

FIG. 1 is a view in elevation of the die, consisting of an internal die cap 10 and external die adjusting ring 12, forming a die-gap 8 from which molten thermoplastic film is extruded to form an upper film bubble 20. The film is drawn down over the mandrel 50 through water-bath assembly 16 to form a lower film bubble 18. Air injected through inlet pipe 30 maintains the upper film bubble at the proper degree of inflation and air injected through inlet pipe 32 does the same for the lower film bubble.

The multi-stepped air-ring assembly 14, situated between the die and mandrel, directs a stream of air against the entire length of the external surface of the upper film bubble and serves to counterbalance the internal pressure, partially cool and solidify the film, but not below the temperature at which crystallization occurs, and direct the film onto the mandrel.

FIG. 2 is an enlarged section through a portion of FIG. 1 showing the die, air-ring, mandrel and water bath in greater detail. The multi-ring assembly 14 comprises an outer plenum chamber wall and mounting ring 44 to which is attached a mounting plate 42 for the multistep rings. An inner plenum chamber wall 72 and inner plenum chamber plate 74 define an air plenum chamber 46 through which air is fed to the rings by annulus 76. Cam ring 24 attached to mounting plate 42 carries outer air-ring 22 and orifice plate 78, middle air-ring 26 and orifice plate 80 and inner air-ring 28 and orifice plate 82. The height of each ring and its attached orifice plate is independently adjustable by handles shown in detail in figures which follow. While not the subject of the instant invention, the construction of the mandrel 50 and the water bath 16 are shown in detail so as to illustrate the best mode of operation of the invention.

FIG. 3 is a section along line 3—3 of FIG. 4 showing construction of the rings, particularly the cams in cam-ring 24 and the cam followers attached to each adjustable ring. The cam ring and the adjustable rings have sufficient clearance relative to the contiguous faces of adjacent rings so as to permit each ring to be readily turned without binding. Face-to-face contact which might cause binding is avoided by the use of a plurality of spring-biased spacing buttons 100 disposed about the inner face of the outer ring and the outer faces of the inner and middle rings. Sealing between the various rings is accomplished by the use of elastomeric "O" rings 110. Inner ring 28 is adjustable in a vertical direction by means of handle 84 (shown in FIG. 6), lateral movement of which causes the ring to rotate and cause a plurality of cam followers 98 secured around the periphery of ring 28 to move in a plurality of cam tracks 92 milled in cam ring 24. A plurality of cam tracks 90 milled in cam ring 24, which are angularly displaced from cam tracks 92 accommodate the cam followers for both the middle and outer rings. Cam followers 96 secured around the outer periphery of the middle ring engage cam tracks 90 and cause the middle ring 26 to be raised or lowered when the ring is rotated by means of handle 86 (shown in FIG. 5). Similarly, cam followers 94 secured around the inner periphery of outer ring 24 engage cam tracks 90 and cause the outer ring to be raised or lowered when the outer ring 22 is rotated by means of handle 88 secured to it. Handle clamp 118, which is slidable on handle 86, engages angle-track 116, which is secured to mounting plate 42 and clamps the handle after positioning.

FIG. 5 referred to above shows how the middle ring handle 86 passes through clearance slot 106 in the outer ring and clearance slot 104 in the cam ring and is attached to middle ring 26. Handle clamp 118 engages angle-track 114 which is secured to mounting plate 42 and fixes the handle after positioning.

FIG. 6 referred to above shows how the inner ring handle 84 passes through clearance slot 106 in the outer ring and clearance slot 102 in the cam ring and is attached to inner ring 28. Handle clamp 118 engages angle-track 112, which is secured to mounting plate 42 and fixes the handle after positioning.

FIG. 4 is a fragmentary plan view on line 4—4 of FIG. 3 showing the control handles for the rings, their angular displacement and the limits of movement.

FIG. 7 is an enlarged section through a portion of the outer ring, cam ring and middle ring detailing the "O" rings 110 and spring-biased spacing buttons. The buttons may be made of any material which will glide readily over the steel or aluminum alloy from which the cam and air-rings are nominally fabricated. Suitable materials are bronze, babbit metal, nylon, polyphenyl carbonates available commercially as Lexan, polyfluoroethylenes available commercially as Teflon and polyphenylethers available commercially as PPO.

Figure 8:
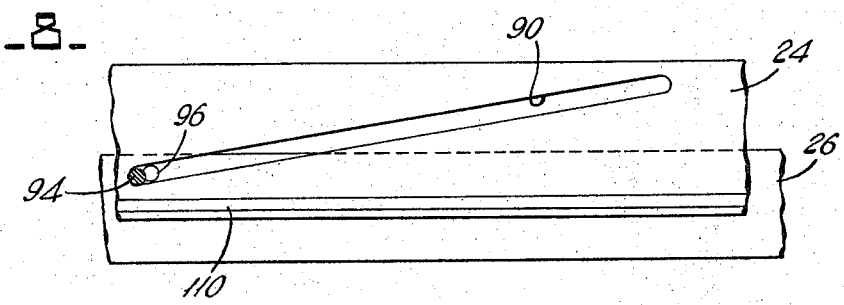
FIGS. 8 and 9 are sections along lines having the same indicia on FIG. 4.

FIG. 8 is a section through FIG. 4 at points 8—8 showing the cam track 90, for the cam followers 94 and 96 attached to the outer ring 22 and the middle ring 26, respectively.

Figure 9:
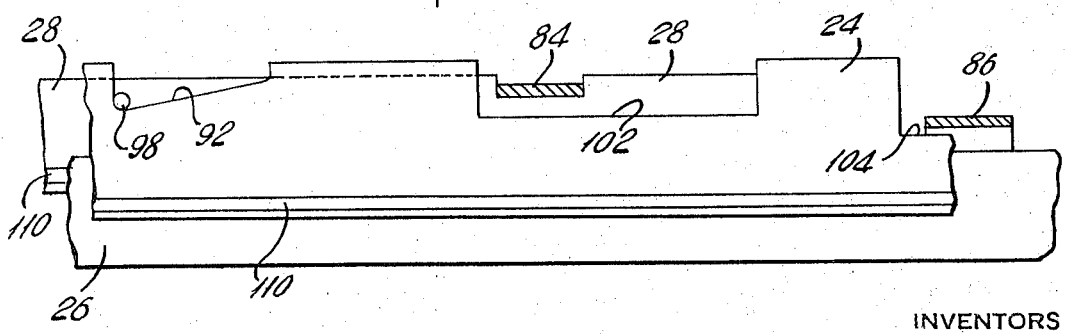

FIG. 9 is a section through FIG. 4 at points 9—9 showing inner ring handle 84 attached to inner-ring 28, clearance slot 102 in cam ring 24 for handle 84 and cam track 92 for cam follower 98.

FIG. 10 referred to above shows in perspective the arrangement of the operative elements for the rings.

FIGS. 11 and 12 show details as indicated above.

While not wishing to be bound by any theory of operation, it is believed that the rings co-operate to produce a gradient in pressure drop of diminishing scope as the film descends from the die to the mandrel and act as steering guides to maintain uniformity in shape, size and thickness of the upper film bubble.

It will therefore be apparent to those having skill in the art that variations in the ring structure and alternative means for attaining a gradient in pressure along the external surface may be used without departing from the scope of the invention as disclosed. For example, the cams and cam followers may be replaced by multi-thread screws having a sharp helix angle as a means for raising and lowering the orifice plates attached to the rings. In like manner, once a prototype has established the correct size and position of the orifices for a given size of die and mandrel, a ring assembly having a plurality of fixed plates or a stepped cone instead of adjustable rings may be used for a given resin. Similarly, the single air inlet and the rings may be replaced with a series of air inlets having approximately the same diameter and disposition of the orifice plates with individual pressure regulation on each inlet so as to provide a gradient in pressure from the highest inlet to the lowest. The contribution to the advancement in the art of producing film from thermoplastic resins is best illustrated by the following examples.

COMPARISON OF SINGLE AND MULTI-STEP AIR RINGS

Commercial, plant size film equipment consisting of an extruder, die, air-ring assembly, water-cooled mandrel, external water bath, nip rolls and take-up rolls were used for the following test runs. A slip-ring adapter connecting the extruder to the die permitted the die, ring assembly, mandrel and water bath which were connected to one another in fixed relationship to be slowly rotated in an oscillatory manner through an angle of 360° for the purpose of randomizing any variation in film thickness. A speed control on the oscillating equipment permitted the speed of rotation to be varied from about 4 to 80 inches per minute measured as lineal speed at the periphery of the mandrel.

A standard batch of crystalline polypropylene resin having an n-heptane insoluble content of 95±1%, a melt index of 65±0.5 and a density in the range of 0.902–0.905 was used for all of the following tests.

TEST WITH MULTI-STEP RING

The polypropylene resin was fed to the extruder at the rate of 1000 pounds per hour and extruded through a 36 inch die having a die-gap of 20 mils (0.020 inches) at a temperature of 240±10° C. and a pressure of 5,000 p.s.i.g., using an arrangement of die, rings, mandrel and water bath illustrated in the attached figures.

The extruded tube leaving the die at a lineal velocity of about 20 feet per minute was partially inflated by air at a pressure in the range of 0.05 to 0.5 inches of water issuing from the top edge of the mandrel, which had a maximum diameter near its top of about 46 inches, tapering to about 45 inches in one foot at its bottom, and drawn down over the cooled mandrel through the water bath. A lower film bubble was maintained by air injected below the mandrel until the tube was flattened by pinch or nip rolls and wound on take-up rolls.

Air was fed at a pressure in the range of 0.05 to 1.5 inches of water to the multi-step air-ring assembly which was disposed between the die and mandrel and had the following inside diameters for the orifice plates: inner orifice plate—38.50 inches; middle orifice plate—42 inches; outer orifice plate—45 inches.

Under steady operating conditions shown below in Table I, draw-down speeds of 300 lineal feet per minute and a film gauge thickness of 1 mil (0.001 inch) were readily obtained and yielded film having outstanding clarity and freedom from striations, fog or irregularity.

TABLE I.—STEADY STATE OPERATION WITH MULTI-STEP RINGS

| | |
|---|---|
| Distance of inner orifice plate from die ___inches__ | 1.50 |
| Distance of middle orifice plate from die __do____ | 3.125 |
| Distance of outer orifice plate from die ___do____ | 4.250 |
| Air pressure on plenum chamber to rings__in. $H_2O$__ | 1.0 |
| Air pressure in upper film bubble _____in. $H_2O$__ | 0.21 |
| Air pressure in lower film bubble _____ | Atmos. |
| Air temperature _____° C__ | 20 |
| Distance mandrel to die _____inches__ | 6.0 |
| Length of mandrel _____do____ | 12 |
| Temperature of water to mandrel _____° C__ | 10 |
| Temperature of water from mandrel _____° C__ | 15 |
| Temperature of water to water bath _____° C__ | 10 |
| Temperature of water from water bath ____° C__ | 30 |
| Oscillation speed (at periphery of mandrel) inches per min__ | 10 |

In order to obtain film of the highest clarity, it is essential to maintain the film before quenching in the water bath and cooling by contact with the mandrel above the temperature at which crystallization occurs. Slow cooling by means of air alone, for example, in the region where the film is in the form of the upper film bubble will cause "fogging" and opalescent zones to appear. Rapid quenching such as occurs in the water bath and on the mandrel yields film having the highest clarity.

TESTS WITH SINGLE AIR-RING

The following tests, which in point of time preceded the test with the multi-step air-rings detailed above, were made with a commercial air-ring which consisted essentially of mounting plate 42 defining an annulus 76 through which air was fed. Difficulty in producing film of satisfactory quality was immediately apparent even when the rate of polymer fed to the extruder was lowered to 250 pounds per hour and the temperature of extrusion was dropped so as to obtain film of higher rigidity. Attempts to utilize the 46 inch mandrel met with failure and film of poor quality could only be produced with a mandrel having a diameter of 38 inches.

Since the major difficulty involved formation of an upper film bubble having a diameter in excess of the mandrel at a point below the air-ring, it was postulated that sealed guides which would direct the film by means of isolated areas of pressure exerted on the external surface of the bubble would overcome the difficulty. The result of many trials in this direction are the multi-step rings of this invention.

What is claimed is:

1. In a process for the formation of tubular thermoplastic film comprising extruding a thermoplastic resin generally downward through a die in the form of a molten substantially tubular film body, partially cooling said tubular film body by introducing a single stream of gas between said film and an air ring disposed outwardly from said film to partially solidify said film, downwardly passing said film to engage a cooling mandrel positioned in a bath containing a cooling liquid and thereafter recovering said tubular film, the improvement which comprises reducing the pressure of said single stream of gas in discrete steps by means of a multi-step air ring surrounding said film wherein said ring includes at least two annular orifices in echelon array having successively larger diameters between said die and said mandrel with each orifice being independently adjustable as to its vertical distance from said die thereby defining a continuous passageway between said film and said ring, in order to guide and control the expansion of said film between said die and said mandrel.

2. Process according to claim 1 wherein said thermoplastic resin is substantially crystalline in character.

3. Process according to claim 2 wherein said crystalline thermoplastic resin is polypropylene.

4. Process according to claim 2 wherein the temperature to which said tubular film is preliminarily cooled in order to partially solidify it prior to engaging said mandrel is to a temperature above the crystallization temperature of said thermoplastic resin and said cooling on said mandrel is below the temperature at which crystallization occurs in said resin.

5. An apparatus for extruding film from thermoplastic compositions which comprises:
   (a) a die, defining a die gap, for extruding a molten tubular body in a generally downward direction;
   (b) a liquid cooled mandrel of larger diameter than said die positioned axially below said die;
   (c) means for forwarding said tubular film from said die downwardly over the outer surface of said mandrel;
   (d) a multi-step air ring means disposed outwardly from said tubular body and defining a continuous passageway for a single stream of cooling gas between said ring means and said body, said ring means including at least two annular orifices in echelon array having successively larger diameters between said die and said mandrel, for reducing the pressure of said gas in discrete steps, each orifice being independently adjustable as to its vertical distance from said die; and
   (e) means for supplying a gas in a single stream under pressure between said orifices and thereby to guide and control the expansion of the film between said die and said mandrel.

6. Apparatus according to claim 5 wherein said orifices are vertically adjustable to conform to a straight line projected through them, said straight line lying outside a straight line projected from said die-gap to the top edge of said mandrel.

7. Apparatus according to claim 5 wherein said orifices lie along an arc projected through them, the sagitta of said arc having a maximum of 7.5% of the length of the chord subtending the arc.

(References on following page)

References Cited

UNITED STATES PATENTS

| | | | |
|---|---|---|---|
| 3,400,184 | 9/1968 | Matsuo et al. | 264—95 X |
| 3,507,006 | 4/1970 | Princen. | |
| 3,685,576 | 8/1972 | North | 425—72 X |
| 3,568,252 | 3/1971 | Masuda et al. | 264—95 X |
| 3,548,042 | 12/1970 | Hinrichs | 264—95 X |

JEFFERY R. THURLOW, Primary Examiner

U.S. Cl. X.R.

264—95, 178 R, 209, 237; 425—71, 72, 326 R